United States Patent [19]

Lopez

[11] Patent Number: 5,721,550
[45] Date of Patent: Feb. 24, 1998

[54] TWO CHANNEL REMOTE CONTROL SYSTEM FOR AN AUTOMOBILE AND METHOD THEREFOR

[76] Inventor: Pedro F. Lopez, 6912 SW. 148th Ave., Miami, Fla. 33193

[21] Appl. No.: 611,380

[22] Filed: Mar. 5, 1996

[51] Int. Cl.⁶ .................................................. G08C 19/12
[52] U.S. Cl. ................. 341/176; 340/425.5; 340/825.44; 379/57; 307/10.1; 180/167
[58] Field of Search ........................... 341/176, 180; 340/311.1, 425.5, 438, 459, 463, 825.37, 825.44, 825.69, 825.72; 367/197; 379/57; 307/10.1, 10.6, 10.7, 10.8; 180/167

[56] References Cited

U.S. PATENT DOCUMENTS

| | | | |
|---|---|---|---|
| 4,208,630 | 6/1980 | Martinez | 340/311.1 |
| 5,113,427 | 5/1992 | Ryoichi et al. | 379/57 |
| 5,534,845 | 7/1996 | Issa et al. | 340/425.5 |
| 5,588,038 | 12/1996 | Snyder | 379/57 |

OTHER PUBLICATIONS

Product Brochure for Secopage 35 Multi–Channel Alarm Pager System. Published 1995.

*Primary Examiner*—Jeffrey Hofsass
*Assistant Examiner*—Andrew Hill
*Attorney, Agent, or Firm*—Robert C. Kain, Jr.

[57] ABSTRACT

The two channel remote control system activates the engine of an automobile and also activates predetermined accessories in the automobile such as a heater or an air-conditioner. A first paging system is activated by telephonic inputs originating from a user. This first paging system generates a start remote command. A first paging receiver is mounted in the automobile and receives the start remote paging command. The first paging receiver is acoustically or optically coupled to an audio receiver which is mounted in the automobile. The audio receiver, receiving the start remote command, triggers a controller circuit, a timing circuit, an ignition control circuit and a start motor circuit. The timing circuit generates periodic ignition trigger signals for the ignition control circuit. These trigger signals are generated a predetermined number of times. The timing circuit generates an ignition OFF signal after a predetermined period after receipt of the start remote command. The timing circuit issues another trigger signal to the start motor circuit. The start motor circuit then periodically activates the starter motor driving the engine in the automobile based upon a periodic starter motor ON signal. The remote control system also includes a sensor for determining when the engine has started. After the engine has started, an accessory control circuit activates the heater or the air-conditioner. The remote control system also includes a door open circuit. The ignition is turned OFF upon receipt of a door open signal from the door open circuit. The remote control system also includes, in the automobile, a multi-channel paging transmitter. This multi-channel paging transmitter generates first, second and third paging signals to a second pager receiver carried by the user. The first, second and third paging signals correspond to the motor or engine start condition, door open signal, and a motor or engine OFF condition. The user, when carrying the multi-channel paging receiver, is provided alarm indicators indicating that the engine has started or a door in the automobile has opened or that the engine has been turned OFF.

18 Claims, 4 Drawing Sheets

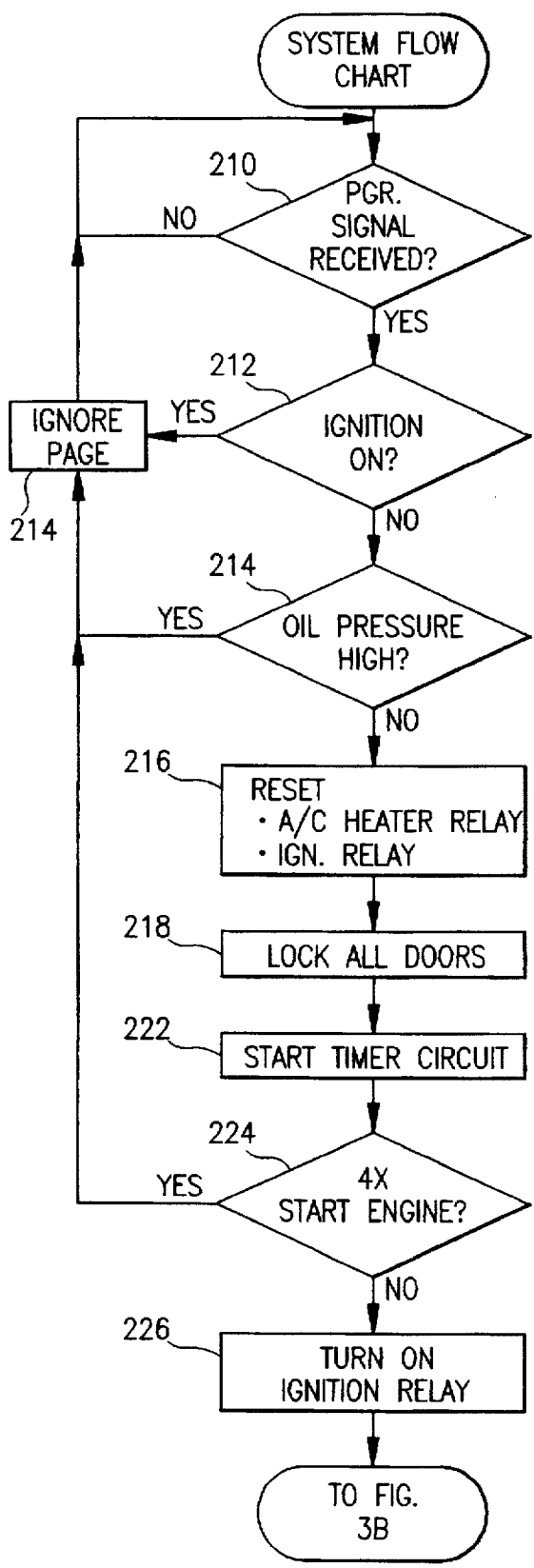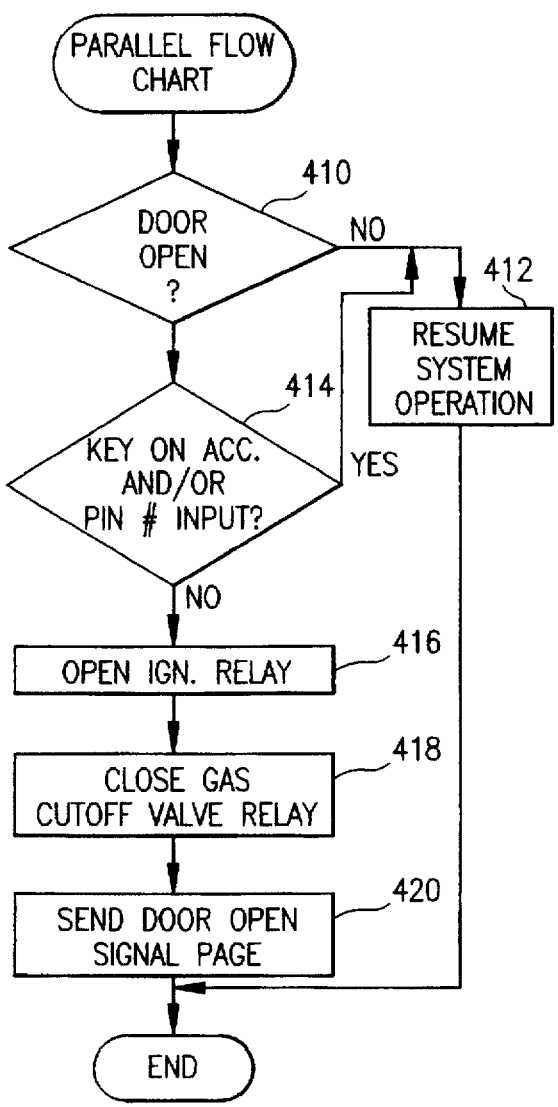
Fig. 3A
Fig. 4

TWO CHANNEL REMOTE CONTROL SYSTEM FOR AN AUTOMOBILE AND METHOD THEREFOR

The present invention relates to a two channel remote control system for an automobile and a method for activating the engine of the automobile and remotely turning on predetermined accessories in the automobile. The present system utilizes two paging systems. When used herein, the term "automobile" also covers a control system for a mobile home and a recreational vehicle.

BACKGROUND OF THE INVENTION

Remote control systems for activating an automobile engine and turning on heaters and air-conditioners commonly utilize a remote control device carried by the user. Typically, this remote control device turns on the engine and/or the heater or air-conditioning unit if the remote control device is a relatively short distance to the automobile. Typical distances are a maximum of 100–200 yards. However, these systems are simply one-way remote control systems and the user does not receive any indication from the remote control system indicating that the engine has been successfully turned on and/or the accessories have been turned on.

There are other systems available which issue paging signals to a pager receiver carried by the user. One of these paging systems is sold as SECOPAGE 35. The SECOPAGE 35 is a multi-channel alarm pager system with includes a pager transmitter mounted in the car and a pager receiver carried by the user. The pager transmitter mounted in the car monitors up to three conditions in the automobile. Upon sensing one of these three predetermined conditions, the SECOPAGE system issues a uniquely configured pager signal to the pager receiver worn by the user. The pager receiver worn by the user alerts the user of the occurrence of that condition at the automobile. The SECOPAGE multi-channel alarm pager system can page the user up to two miles from the automobile.

OBJECTS OF THE INVENTION

It is an object of the present invention to provide a two channel remote control system for an automobile.

It is a further object of the present invention to provide a two channel remote control system for an automobile wherein the user turns the automobile on based upon activation of the first paging system.

It is a further object of the present invention to provide a two channel remote control system wherein the user starts his or her automobile from and remote location and is further notified when the engine is ON, when any of the doors of the automobile are opened, and when the engine is turned OFF after a predetermined period of time.

It is an additional object of the present invention to cut off the ignition and the gas to the engine if any door in the automobile is open.

It is a further object of the present invention to enable the user to control his or her automobile at a great distance away from the automobile.

It is an additional object of the present invention to provide a remote control system which automatically turns OFF the automobile after a certain time period.

SUMMARY OF THE INVENTION

The two channel remote control system activates the engine of an automobile and also activates predetermined accessories in the automobile such as a heater or an air-conditioner. A first paging system is activated by telephonic inputs originating from a user. This first paging system generates a start remote command. A first paging receiver is mounted in the automobile and receives the start remote paging command. The first paging receiver is acoustically or optically coupled to an audio receiver which is mounted in the automobile. The audio receiver, receiving the start remote command, triggers a controller circuit, a timing circuit, an ignition control circuit and a start motor circuit. The timing circuit generates periodic ignition trigger signals for the ignition control circuit. These trigger signals are generated a predetermined number of times. The timing circuit generates an ignition OFF signal after a predetermined period after receipt of the start remote command. The timing circuit issues another trigger signal to the start motor circuit. The start motor circuit then periodically activates the starter motor driving the engine in the automobile based upon a periodic starter motor ON signal. The remote control system also includes a sensor for determining when the engine has started. After the engine has started, an accessory control circuit activates the heater or the air-conditioner. The remote control system also includes a door open circuit. The ignition is turned OFF upon receipt of a door open signal from the door open circuit. The remote control system also includes, in the automobile, a multi-channel paging transmitter. This multi-channel paging transmitter generates first, second and third paging signals to a second pager receiver carried by the user. The first, second and third paging signals correspond to the motor or engine start condition, door open signal, and a motor or engine OFF condition. The user, when carrying the multi-channel paging receiver, is provided alarm indicators indicating that the engine has started or a door in the automobile has opened or that the engine has been turned OFF.

BRIEF DESCRIPTION OF THE DRAWINGS

Further objects and advantages of the present invention can be found in the detailed description of the preferred embodiment when taken in conjunction with the accompanying drawings in which:

FIGS. 3A and 3B diagrammatically illustrate the system flow chart showing the operation of the two channel remote control system;

FIG. 4 diagrammatically illustrates the parallel flow chart for determining whether a door is open in the automobile.

DETAILED DESCRIPTION OF THE PREFERRED EMBODIMENT

Figure 1:
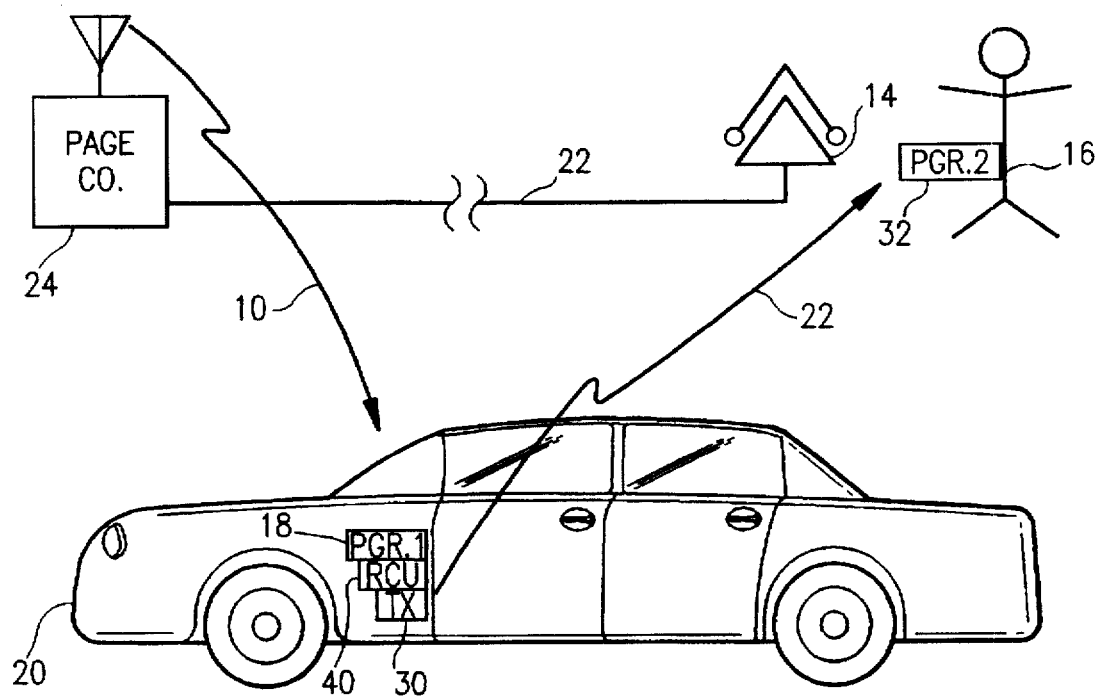
FIG. 1 diagrammatically illustrates the two channel remote control system including the first paging system activated by the telephonic input and the second paging system utilizing the multi-channel paging transmitter mounted in the automobile.

The present invention relates to a two channel remote control system for an automobile and a method therefor. FIG. 1 shows a first paging system 10 and a second paging system 12. The first paging system includes a telephonic input device 14 which is commonly configured as an TOUCHTONE telephone. To activate the first paging system 10, user 16 dials the telephone number for pager PGK 18, which corresponds to a pager receiver PGR. 1 located in automobile 20. The telephonic input is carried by telephone lines 22 to a pager company 24. Pager company 24 issues a paging signal to pager receiver 18 located in automobile 20. The signal is identified as signal 10 and represents the start remote paging command sent over the first paging system.

The second paging system is activated by multi-channel paging transmitter 30 which is also mounted in automobile 20. This multi-channel paging transmitter generates a plurality of paging signals and particularly, first, second and third paging signals to a pager/receiver 232 (PGR. 2) carried by user 16. In this manner, user 16 is notified immediately when the engine in automobile 20 has been turned ON, or when any of the doors in automobile 20 have been opened, or when the engine has been turned OFF after the remote control circuit times out (about 20 minutes).

Figure 2:
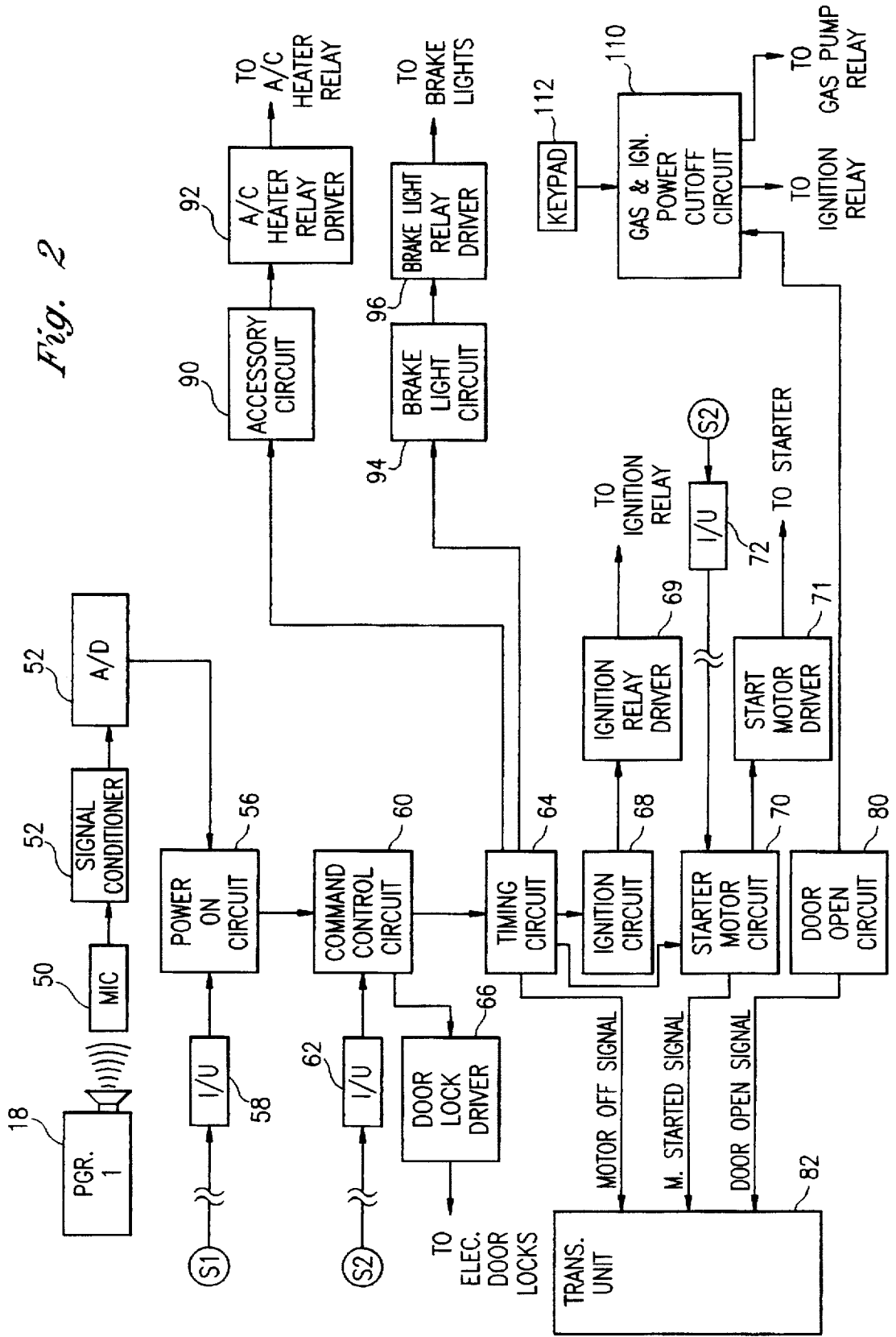
FIG. 2 diagrammatically illustrates the electrical components, as functional block diagrams, for the remote control system mounted in the automobile.

FIG. 2 diagrammatically illustrates the electrical block diagram or function diagrams of the electronic circuit for the system mounted in automobile 20. In the present embodiment, this circuit utilizes discrete logic elements. However, a microprocessor may also be used. Pager receiver 18 (PGR. 1) is acoustically coupled to a microphone 50. The acoustic coupling to microphone 50 is helpful because the user can simply contract with any paging company in his or her locale and upon pager receiver PGR. 1. Upon entering a contract with paging company 24, the user can simply place pager 1 in the remote control unit 40. If the user is dissatisfied with paging company 20, the user can simply remove pager 1 from the remote control unit 40, and replace that pager with a new pager number. In such a manner, the user could elect the geographic range for pager company 20 to be citywide, countywide, statewide or nationwide. In any event, user 16 activates pager 1 by telephonic input 14.

Figure 5:
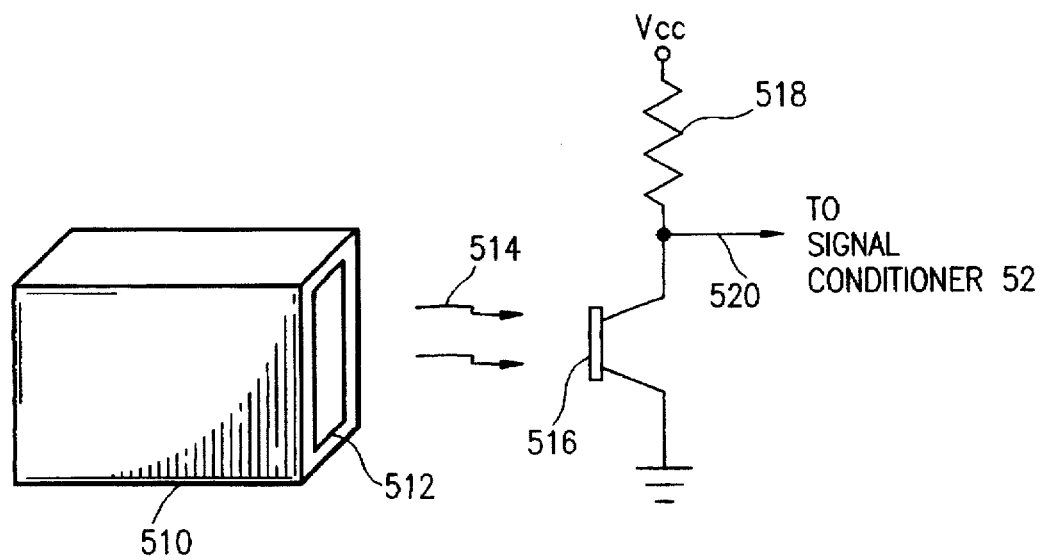
FIG. 5 diagrammatically illustrates the optical link between the first pager receiver and the remote control system.

FIG. 2 shows that there is no electrical connection between pager 1 and microphone 50. The only connection is an acoustic link between the pager and the microphone. FIG. 5 shows an optical link. In FIG. 2, the output of microphone 50 is fed to a signal conditioner 52. Signal conditioner 52 may consist of an amplifier, various filters, and other devices which condition the page received command signal. The condition signal is fed to an analog to digital converter 54. The output of A/D converter 54 is applied to a power ON circuit 56. In addition, the power ON circuit 56 is fed a signal from sensor S1. As an example, sensor S1 determines whether the engine in the automobile is in an ON condition due to the presence of an ignition voltage. Sensor S1 monitors ignition voltage. An interface unit 58 converts the ignition voltage ON signal obtained by sensor S1 and applies the representative signal to the power ON circuit 56. After the user has generated a start remote command by activating pager 1, the power ON circuit 56 turns ON the remainder of the remote control system.

The output of power ON circuit 56 is applied to command control circuit 60. In addition, sensor S2, coupled to control circuit 60, monitors the condition of the oil pressure in the automobile. When the oil pressure is high, this indicates that the engine or motor in the automobile is ON. Sensor S2 is isolated from command control circuit 50 by an interface unit 62.

Upon receipt of the start remote command initially generated by pager 1, the command control circuit initiates the operation of timing circuit 64. Substantially concurrently therewith, command control circuit 60 activates door lock driver 66. The output of door lock driver 66 is fed to all of the electric door locks in the automobile, thereby locking the car prior to activating the engine in the automobile.

Timing circuit 64 generates several timing circuit signals for the ignition circuit 68 and the start motor circuit 70, accessory circuit 90 and brake light circuit 94. The Timing Circuit Table set forth below provides some exemplary timing signals generated by the timing circuit 64. The following Timing Chart shows the sequence and type of signal.

Timing Circuit Table 18 second trigger ignition driver circuit count down 4 times to start auto (i.e., count 4× ignition trigger)

count down 20 minute automobile run timer

Timing Chart

Time 1—to ignition circuit (ON 18 seconds)
Time 2—to starter motor circuit (4 time ON-OFF)
Time 3—to accessory circuit (ON less than 20 minutes)
Time 4—to brake light circuit (ON-OFF multiple times)
Time 5—to ignition circuit (if engine ON, send OFF signal at 20 minutes)

In the present embodiment, the timing circuit 64 generates an 18 second trigger for the ignition circuit 68. In other words, timing circuit 64 generates an ignition trigger signal every 18 seconds. Upon receipt of this trigger signal, the ignition circuit 68 generates a signal for the ignition relay driver 69. Upon receipt of that signal, the ignition relay driver turns the ignition relay ON.

The timing circuit also effects the start motor circuit 70. Upon receipt of the start motor signal, motor circuit 70 activates start motor driver 71. The output of start motor driver 71 is applied to the starter motor in the automobile.

To provide indication when the engine has been turned ON, starter motor circuit 70 is supplied with a signal from sensor S2 which is the oil pressure signal from an oil pressure sensor. The oil pressure signal is conditioned or interfaced with start motor circuit 70 via interface unit 72.

It is important for the user to detect when the remote control device in the automobile has been activated. It is also important for the user to know when the motor has started or if any doors have been opened in the automobile. Further, the user is notified, via an appropriate paging signal, when the engine is turned OFF. The start motor circuit 70 generates a MOTOR STARTED signal which results in a feedback page to the user. A door open circuit 80 generates a DOOR OPEN signal. These three signals constitute the first and second signals that are applied to the multi-channel pager transmitter 82. In the present embodiment, this multi-channel pager transmitter 82 is a SECOPAGE 35 multi-channel alarm pager system. If the engine has been turned ON (based on sensor S2), the timing circuit 64 counts down (or counts up) about 20 minutes. Thereafter the timing circuit turns OFF the ignition circuit 68 and sends a MOTOR OFF signal as a third pager signal to transmitter 82.

As stated earlier, when the multi-channel pager transmitter 82 receives the motor started signal, or the door open signal, or motor OFF signal, a unique page signal is generated from transmitter 30 (FIG. 1) to pager/receiver 2 carried by or in close proximity to user 16. Accordingly, the user not only activates the first paging system, thereby turning ON the entire remote control but also obtains at least three feedback signals from the remote control unit. These three feedback signals correspond to the motor started signal, the alarm signal identified herein as the door open signal, and the engine or motor OFF signal.

Returning to FIG. 2, once the start motor circuit 70 has turned ON the engine as confirmed by sensor S2, the oil pressure sensor, the timer circuit 64 generates a signal to accessory circuit 90. Accessory circuit 90 activates a/c or heater relay driver 92. The output of driver 92 is applied to the air-conditioner or the heater relay as pre-selected by the user. After the air-conditioner or heater has been turned ON, the timing circuit 64 then turns ON brake light circuit 94. This permits a visual alarm to the user if the user is within viewing distance of the automobile. The brake light circuit 94 activates a brake light relay driver 96. The output of relay driver 96 is applied to the brake lights intermittently to permit the user to find his or her car if the car is lost in the parking lot.

The door open circuit 80 is also connected to a gas and ignition power cutoff circuit 110. Upon sensing the DOOR OPEN condition, the gas and ignition power cutoff circuit 110 turns OFF the ignition relay and also cuts off the gas by deactivating the electric gas pump for the gas supply in the automobile. The gas and ignition power cutoff circuit 110 generates these signals unless the user inputs the personal identification number or pin number in keypad 112.

It should be noted that the doors of the automobile are locked before the engine is turned ON. If the engine is not turned ON after four times, based upon the count from timing circuit 64 and start motor circuit 70, the system turns OFF. If the engine is turned ON, the engine will run for approximately twenty minutes. Other run times may be set by the user. After that twenty minute countdown, timing circuit 64 issues a command which turns OFF the ignition circuit 68. The ignition circuit 68 thereby opens the ignition relay and turns off the car. It has been determined that this time period is sufficient to cool down the car or heat up the car. Of course, this predetermined time period can be enlarged or reduced depending upon the user's instructions.

In the event the user turns on the car and turns on the accessories, and the user then opens the door, the system will automatically turn off the car. The user would then have to insert the key into the ignition, turn the key to the accessory mode, place the automobile's electrical system in the "accessory" mode, input his or her personal identification number into keypad 112, and then turn on the car. In the absence of following these steps, the user cannot turn the engine of the automobile on.

Figure 3B:
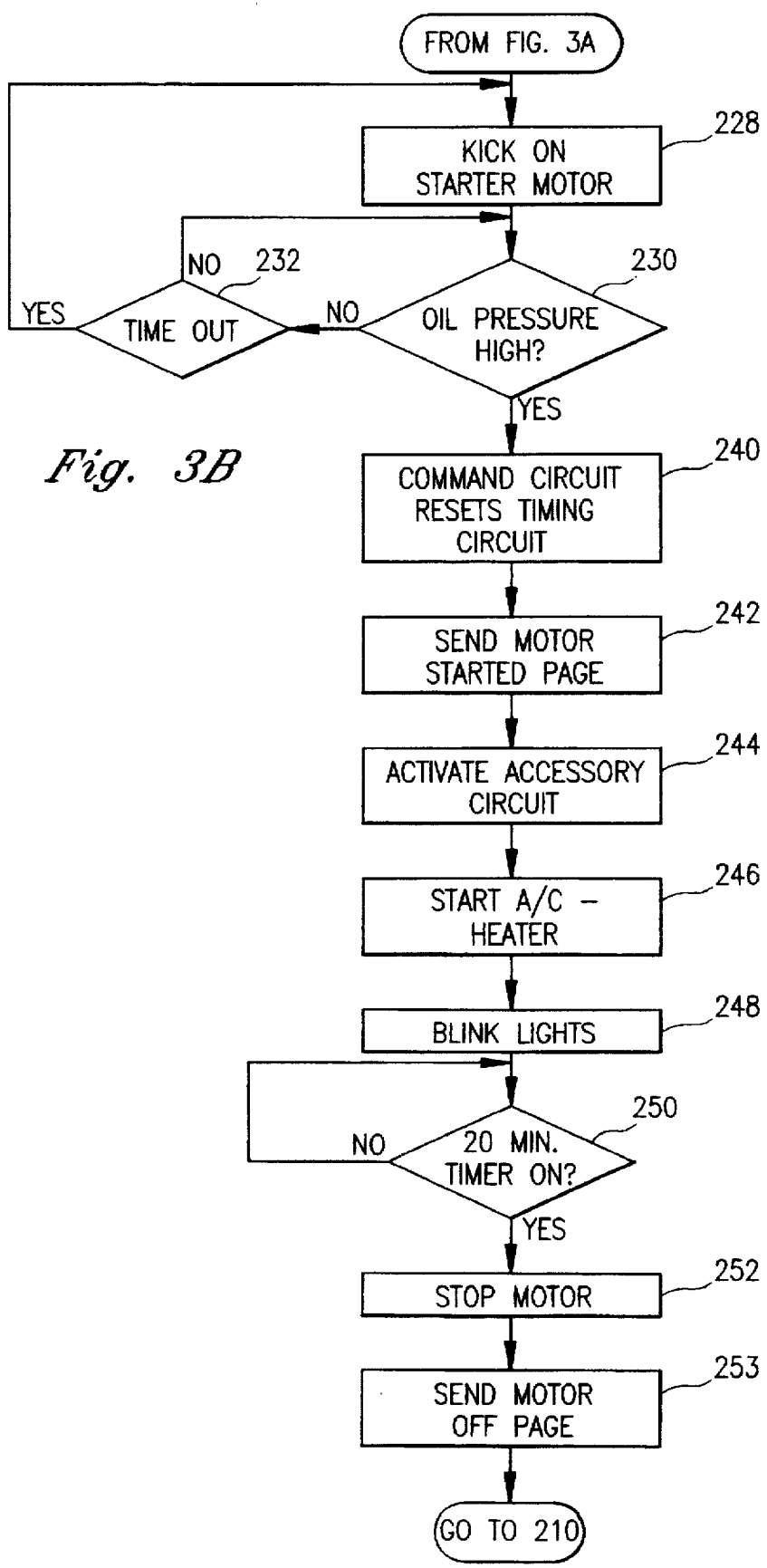

FIGS. 3A, 3B and 4 diagrammatically illustrate the operational procedure of the electronic circuitry and system. FIGS. 3A and 3B provide the system flow chart. In decision step 210, a determination is made whether the pager signal for activating the remote control has been received. If the NO branch is taken, the system returns to a point immediately preceding decision step 210. If the YES branch is taken, the system in decision step 212 determines whether the ignition is ON. If YES, the systems ignores the page in step 214 and returns to a point immediately preceding decision step 210. If the ignition is not ON, the NO branch is taken and in step 214 the system determines whether the oil pressure is high. A YES decision from that step indicates that the engine is ON and the system in step 214 ignores the page. If the NO branch is taken from decision step 214, in step 216, the air-conditioner and heater relays, as well as the ignition circuit relays, are reset OFF. In step 218, all doors in the automobile are locked via the electronic door locks. In step 222, the timer circuit is started.

Decision step 224 determines whether a start engine trigger signal has been generated four times. If YES, the system moves back to a point preceding the pager signal received step 210. If fewer than four engine trigger ignition signals have been generated by the system, the NO branch is taken and in step 226, the system turns ON the ignition relay. The flow chart then jumps to FIG. 3B.

Following the ignition ON relay step 226, step 228 turns ON or triggers the starter motor in the engine. Decision step 230 determines whether the oil pressure is high. If the oil pressure is high, this indicates that the remote control unit has successfully turned ON the engine. If the NO branch is taken from oil pressure decision step 230, the system determines whether a certain time period is passed in time out decision step 232 (about 18 seconds). If not, the NO branch is taken from decision step 232 and the systems returns to oil pressure decision step 230. If the YES branch is taken, the system returns to a point immediately preceding the kick ON starter motor step 228.

From decision step 230, the system executes step 240. Step 240 activates the command circuit to reset the timing circuit. Step 242 sends a MOTOR STARTED page to pager 2 retained by user 16. In step 244, the remote control unit in the automobile activates the accessory circuit. In step 246, the accessory circuit turns ON the air-conditioner, heater or other components. In step 248, the remote control unit blinks the lights of the automobile.

Decision step 250 determines whether the remote control circuit has turned ON the engine for twenty minutes. If YES, the system stops the motor in step 252, and in step 253, the system sends out a MOTOR OFF page. If not, the system returns to a point immediately preceding timer step 250. After the stop motor step 252 and page step 253, the system returns to decision step 210.

FIG. 4 shows a parallel flow chart which is activated concurrently with the system flow chart. Decision step 410 determines whether any door has been opened in the automobile. If the NO branch is taken, the system executes step 412, which is resume system operation. After resume system operation, the flow chart ends.

If the YES branch is taken from the door open step 410, the system determines in decision step 414 whether the user has inserted the key, turned the key to the accessory mode and placed the electrical system on an "accessory" setting and/or whether the user has input his or her personal identification number into the keypad. If the user has turned ON the automobile or has input the correct identification number, the YES branch is taken and the system resumes conventional operation as set forth in step 412. If the NO branch is taken from decision step 414, the system in step 416 opens the ignition relay. This effectively turns OFF the car. In step 418, the system closes the relay for the existing electrical gas pump by activating the appropriate relay. In step 420, the system sends a DOOR OPEN signal page to the user via multi-channel pager 30 and pager receiver 2 in FIG. 1.

FIG. 5 illustrates an optical coupling for the pager. The first pager 510 has a light emitting display 512 which, when the pager is activated, emits light. This light optically triggers photo-transistor 516 (a Darlington transistor). Transistor 516 is supplied with power Vcc via resistor 518. Then turned ON, the signal on line 520 goes LOW thereby signaling the remote control unit (FIG. 2) to be activated.

By using a detachable pager 18, 510, the user can travel to many cellular paging areas and rent or purchase a pager in those areas. The new pager is simply placed in a holder next to microphone 50 or photo-transistor 516.

The claims appended hereto are meant to cover modifications and changes within the spirit and scope of the present invention.

What is claimed is:

1. A two channel remote control system for activating an automobile and activating predetermined accessories such as a heater or an air conditioner in said automobile, said automobile having an engine, an ignition circuit, a starter motor, electronic door locks and door open sensors, said remote control system comprising:

a first paging system having a telephonic input adapted to be activated by a user, said first paging system having means for generating a start remote command configured as a paging signal, said means for generating triggered by said user's telephonic input;

a first paging receiver mounted in said automobile and having means for receiving said start remote paging command from said first paging system and generating an audio page based thereon;

a second paging system having a multi-channel paging transmitter, said multi-channel paging transmitter mounted in said automobile, said multi-channel paging transmitter adapted to emit first, second and third paging signals;

a second paging receiver carried by said user, said second paging receiver being a multi-channel paging receiver which is part of said second paging system, said multi-channel paging receiver receiving said first, second and third paging signals and providing first, second and third alarm indicators to said user upon receipt thereof;

in said automobile:

an acoustically coupled audio receiver mounted in proximity to said first paging receiver in said automobile, said audio receiver generating an electrical page received command upon receipt of said audio page from said first paging receiver;

a controller circuit, a timing circuit, an ignition control circuit and a start motor circuit, all electrically coupled together with said audio receiver, said controller circuit receiving said page received command from said audio receiver and initiating said timing circuit;

said timing circuit generating an ignition ON signal for said ignition control circuit, and a periodic starter ON signal for said start motor circuit and an accessory ON signal for said accessory circuit, said starter ON signal generated a predetermined number of times by said timing circuit, and said timing circuit generating an ignition OFF signal after a predetermined time period after receipt of said page received command from said controller circuit;

said ignition control circuit coupled to said ignition circuit in said automobile, said ignition control circuit receiving said ignition ON signal and activating said ignition circuit, said ignition control circuit further receiving said ignition OFF signal and turning-off said ignition circuit based thereon;

said start motor circuit coupled to said starter motor in said automobile, said start motor circuit activating said starter motor upon receipt of said starter ON signal from said timing circuit;

means for sensing when said engine has started and generating a motor started signal;

an accessory control circuit coupled to said timing circuit for activating said heater or said air conditioner in said automobile, said timing circuit coupled to said means for sensing and generating said accessory ON signal and thereby activating said heater or air conditioner only in the presence of said motor started signal;

a door open circuit coupled to said door open sensors for determining when any door of said automobile has opened, said door open circuit generating a door open signal thereat;

said multi-channel paging transmitter being mounted in said automobile and being coupled to said timing circuit, said motor start circuit and said door open circuit, said multi-channel paging transmitter transmitting said first, second and a third paging signal to said second pager receiver carried by said user, said first, second and third paging signal corresponding to said motor started signal, said door open signal, and a motor OFF condition;

said multi-channel paging receiver, carried by said user, receiving said first, second and third paging signals and providing first, second and third alarm indicators to said user upon receipt thereof.

2. A two channel remote control system as claimed in claim 1 wherein said accessory control circuit includes a time-out circuit which delays the activation of said heater or air conditioner for a predetermined period of time after receipt of said motor started signal.

3. A two channel remote control system as claimed in claim 2 including means, coupled to said door open circuit for generating said ignition OFF signal and thereby turning-off said engine upon determining that any door of said automobile has opened.

4. A two channel remote control system as claimed in claim 3 wherein said automobile includes a brake light system and said remote control system includes means for activating said brake light system upon activation of said heater or said air conditioner.

5. A two channel remote control system as claimed in claim 4 including means for locking all doors, coupled to said door locks and said controller circuit, upon receipt of said page received command.

6. A two channel remote control system as claimed in claim 1 including means for locking all doors, coupled to said door locks and said controller circuit, upon receipt of said page received command.

7. Method for remotely controlling an automobile engine and activating predetermined accessories such as a heater or an air conditioner in said automobile, said automobile having an engine, an ignition circuit, a starter motor, electronic door locks and door open sensors, the method for remotely controlling using two different paging systems comprising the steps of:

activating a first pager, which is part of one of said two paging systems, which activation is indicative of a start remote command, said first pager being telephonically activated by a user;

providing a second pager receiver being a multi-channel pager receiver, said second pager receiver being carried by said user;

the following steps being executed in said automobile:

determining whether said automobile is currently operating and if so, ignoring said start remote command;

locking all doors in said automobile by activating said electric door locks;

activating said ignition circuit ON for a first predetermined period of time and thereafter deactivating said ignition circuit;

periodically activating said starter motor for a predetermined number of times until (a) said engine is fully operational or (b) said predetermined number is reached;

deactivating said ignition circuit if said door open sensors indicate an open door conditioner activated;

sending first, second and third paging signals to said second pager receiver upon said engine being fully operational, upon said activation of said door open sensors, and after said first predetermined period of time for said ignition circuit, respectively;

at or near said user:

receiving and issuing first, second and third alarm indicators to said user upon receipt of said first, second and third paging signals by said second pager receiver.

8. A method of remote control as claimed in claim 7 including the step of delaying the activation of said heater or air conditioner for a predetermined period of time after receipt of said motor started signal.

9. A method of remote control as claimed in claim 8 including the step of turning-off said engine upon determining that any door of said automobile has opened after receiving said start remote command.

10. A method of remote control as claimed in claim 9 wherein said automobile includes a brake light system and said method includes the step of activating said brake light system upon activation of said heater or said air conditioner.

11. A method of remote control as claimed in claim 10 including the step of locking all doors via said door locks upon receipt of said start remote command.

12. A method of remote control as claimed in claim 7 including the step of locking all doors via said door locks upon receipt of said start remote command.

13. A two channel remote control system for activating an automobile and activating predetermined accessories such as a heater or an air conditioner in said automobile, said automobile having an engine, an ignition circuit, a starter motor, electronic door locks and door open sensors, said remote control system comprising:

a first paging system having a telephonic input adapted to be activated by a user, said first paging system having means for generating a start remote command configured as a paging signal, said means for generating triggered by said user's telephonic input;

a first paging receiver mounted in said automobile and having means for receiving said start remote paging command from said first paging system and generating a light page based thereon;

a second paging system having a multi-channel paging transmitter, said multi-channel paging transmitter mounted in said automobile, said multi-channel paging transmitter adapted to emit first, second and third paging signals;

a second paging receiver carded by said user, said second paging receiving being a multi-channel paging receiver which is part of said second paging system, said multi-channel paging receiver receiving said first, second and third paging signals and providing first, second and third alarm indicators to said user upon receipt thereof;

in said automobile:

an optically coupled light detector mounted in proximity to said first paging receiver in said automobile, said light detector generating an electrical page received command upon receipt of said light page from said first paging receiver;

a controller circuit, a timing circuit, an ignition control circuit and a start motor circuit, all electrically coupled together with said audio receiver, said controller circuit receiving said page received command from said audio receiver and initiating said timing circuit;

said timing circuit generating an ignition ON signal for said ignition control circuit, and a periodic starter ON signal for said start motor circuit and an accessory ON signal for said accessory circuit, said starter ON signal generated a predetermined number of times by said timing circuit, and said timing circuit generating an ignition OFF signal after a predetermined time period after receipt of said page received command from said controller circuit;

said ignition control circuit coupled to said ignition circuit in said automobile, said ignition control circuit receiving said ignition ON signal and activating said ignition circuit, said ignition control circuit further receiving said ignition OFF signal and turning-off said ignition circuit based thereon;

said start motor circuit coupled to said starter motor in said automobile, said start motor circuit activating said starter motor upon receipt of said starter ON signal from said timing circuit;

means for sensing when said engine has started and generating a motor started signal;

an accessory control circuit coupled to said timing circuit for activating said heater or said air conditioner in said automobile, said timing circuit coupled to said means for sensing and generating said accessory ON signal and thereby activating said heater or air conditioner only in the presence of said motor started signal;

a door open circuit coupled to said door open sensors for determining when any door of said automobile has opened, said door open circuit generating a door open signal thereat;

said multi-channel paging transmitter being mounted in said automobile and being coupled to said timing circuit, said motor start circuit and said door open circuit, said multi-channel paging transmitter transmitting said first, second and a third paging signal to said second pager receiver carried by said user, said first, second and third paging signal corresponding to said motor started signal, said door open signal, and a motor OFF condition;

said multi-channel paging receiver, carried by said user, receiving said first, second and third paging signals and providing first, second and third alarm indicators to said user upon receipt thereof.

14. A two channel remote control system as claimed in claim 13 wherein said accessory control circuit includes a time-out circuit which delays the activation of said heater or air conditioner for a predetermined period of time after receipt of said motor started signal.

15. A two channel remote control system as claimed in claim 14 including means, coupled to said door open circuit for generating said ignition OFF signal and thereby turning-off said engine upon determining that any door of said automobile has opened.

16. A two channel remote control system as claimed in claim 15 wherein said automobile includes a brake light system and said remote control system includes means for activating said brake light system upon activation of said heater or said air conditioner.

17. A two channel remote control system as claimed in claim 16 including means for locking all doors, coupled to said door locks and said controller circuit, upon receipt of said page received command.

18. A two channel remote control system as claimed in claim 13 including means for locking all doors, coupled to said door locks and said controller circuit, upon receipt of said page received command.

* * * * *